US 6,431,383 B1

(12) United States Patent
Mozley et al.

(10) Patent No.: US 6,431,383 B1
(45) Date of Patent: Aug. 13, 2002

(54) ENHANCED REVERSE BUCKLING RUPTURE DISC

(75) Inventors: Robert M. Mozley, Raytown; James M. Shivers, Kansas City, both of MO (US)

(73) Assignee: Continental Disc Corporation, Liberty, MO (US)

( * ) Notice: Subject to any disclaimer, the term of this patent is extended or adjusted under 35 U.S.C. 154(b) by 0 days.

(21) Appl. No.: 09/723,659

(22) Filed: Nov. 28, 2000

Related U.S. Application Data

(60) Division of application No. 09/268,413, filed on Mar. 15, 1999, now Pat. No. 6,241,113, which is a continuation-in-part of application No. 08/933,281, filed on Sep. 18, 1997, now Pat. No. 6,006,938.

(51) Int. Cl.[7] .............................................. B65D 25/00
(52) U.S. Cl. .................... 220/89.1; 220/89.2; 220/89.3; 137/68.27; 137/69
(58) Field of Search .............................. 220/89.2, 89.3, 220/89.1; 137/68.19, 68.21, 68.25, 68.27, 69

(56) References Cited

U.S. PATENT DOCUMENTS

| | | | | | |
|---|---|---|---|---|---|
| 2,980,286 A | * | 4/1961 | Coffman | .................... | 220/89.2 |
| 3,109,554 A | * | 11/1963 | Porter et al. | ................ | 220/89.2 |
| 4,580,691 A | * | 4/1986 | Hansen | ...................... | 220/89.3 |
| 5,082,133 A | * | 1/1992 | Farwell et al. | ............. | 220/89.2 |
| 5,167,337 A | * | 12/1992 | Short, III et al. | .......... | 220/89.2 |
| 6,006,938 A | * | 12/1999 | Mozley et al. | ............. | 220/89.2 |
| 6,220,269 B1 | * | 4/2001 | Muddiman et al. | .... | 220/89.3 X |
| 6,241,113 B1 | * | 6/2001 | Mozley et al. | ............. | 220/89.1 |

* cited by examiner

*Primary Examiner*—S M Pollard
(74) *Attorney, Agent, or Firm*—Howrey Simon Arnold & White, LLP

(57) ABSTRACT

An improved reverse rupture disc for use as a safety pressure relief device is provided. The disc is defined by an annular flat flange region, a concave-convex disc dome region and a transition region that joins the disc-shaped flat flange region to the concave-convex disc dome region. One or more deformations may be formed at or near the apex of the disc dome region for weakening the disc to the point that incidental damage to the disc will not weaken the disc any further, thereby ensuring that the disc will reverse at a certain pressure, and no lower. The disc may also formed with one or more irregular transition regions at the base of the disc and a partial circular groove in the transition region. The irregular transition region of the disc cooperates with a shear enhancing means such as a protrusion or notch formed in a support ring or disc holder disposed downstream of the disc to sever the disc dome from the annular flat flange region along the groove in the transition region. A back pressure support means extends over the transition region and potentially over the dome region to prevent vacuum and forward to reverse cyclical pressures in the convex direction from damaging or destroying the disc. An ungrooved region of the transition region acts as a hinge holding the ruptured disc dome to the flat flange region after the disc has ruptured. The ruptured disc dome hangs over an arcuate projection formed in the support ring or disc holder, which helps to prevent the disc from fragmenting.

10 Claims, 9 Drawing Sheets

ENHANCED REVERSE BUCKLING RUPTURE DISC

CROSS REFERENCE TO RELATED APPLICATION

This application divisional of application Ser. No. 09/268,413, filed Mar. 15, 1999, U.S. Pat. No. 6,241,113 which is a is a continuation in part of prior U.S. application Ser. No. 08/933,281 filed Sep. 18, 1997 now U.S. Pat. No. 6,006,938.

FIELD OF THE INVENTION

The present invention relates generally to safety pressure relief devices and more particularly to reverse buckling rupture discs which are designed to reverse and rupture at low bursting pressures and are highly reliable.

BACKGROUND OF THE INVENTION

Relief devices of the type commonly known as rupture discs have been utilized in industry for many years to provide a safety mechanism to relieve excess pressure from an overpressurized system or vessel in a reliable manner. The rupture disc is most frequently placed in a vent or a pressure vessel or the like so as to prevent flow of fluid through the vent until the disc ruptures. Through the years, numerous improvements have been made in the rupture disc concept in order to reduce the cost and improve the reliability of the disc.

A specific type of disc normally referred to as a reverse buckling rupture disc has also been utilized for a number of years and functions under the principle that a disc dome is formed in the disc which is positioned in the vent such that the disc dome points toward or faces the pressure side of the vent, i.e., the convex side of the disc dome faces the internal region or upstream side of the vent where pressurized fluid is likely to produce an overpressure that would be dangerous or destructive if not relived. One advantage of reverse buckling type discs is that systems being protected by the discs can be operated at pressures relatively close to the bursting pressure of the disc without producing fatigue and failure which occurs in many forward acting bursting discs when operated for long periods of time near the rated bursting pressure of such devices. When fluid pressure reaches a preselected pressure for which the disc dome was designed to rupture, the disc dome starts the collapse, i.e, the column or arch of the disc dome on one side thereof starts to buckle. It is believed that as the arch on one side of the disc dome starts to collapse, a buckling-type wave typically propagates across the surface of the disc dome to the opposite side of the disc dome where total collapse eventually occurs. This buckling wave tends to create a whiplash effect on the opposite side of the disc dome so that the disc dome at this location is rather violently urged in the direction to which the concave region of the disc dome faces (i.e., the downstream side of the vent).

One disadvantage of some conventional reverse rupture discs is that if they are damaged during handling, installation, or otherwise, they can buckle at a pressure below the rated pressure for the disc. In some cases, the disc will buckle at a pressure of between 40 and 80 percent of the rated pressure. For example, if the rated pressure is 100 psi, a damaged disc may buckle at between 40 and 80 psi. While the reverse rupture disc may buckle or reverse at such pressures, it will not necessarily open at these pressures and once a reverse rupture disc becomes inverted, it thus acts as a forward acting rupture disc which will rupture at a higher pressure than the initial buckling pressure. For such discs the rupture pressure may be as much as three to ten times the rated pressure.

Another disadvantage of some conventional reverse rupture buckling devices is that they are incapable of reversing and rupturing at low bursting pressures. Bursting pressures are generally defined relative to the size of the disc. For example, 15 psig would be a low bursting pressure for a 2 inch diameter disc made of stainless steel. Conventional limitations to achieving low bursting pressures have been twofold (1) causing the rupture disc dome to reverse at a low pressure, and (2) being able to open the rupture disc at the lower reversal pressures. As previously mentioned, some damaged, conventional reverse buckling rupture discs may reverse at a low pressure but not rupture at that pressure. Also, it is more difficult to rupture conventional reverse buckling rupture discs at low pressures where the media is noncompressible (e.g., a liquid). This is because a noncompressible media such as a liquid does not impart the same dynamic energy to the dome during collapsing as a compressible media does.

Many of the conventional reverse buckling rupture discs include knife blades positioned on the concave side of the disc dome which are normally in spaced relationship to the disc dome, but which are engaged by the disc dome upon buckling. The knives cut the disc dome typically into quarter sections. Knife blade assemblies for reverse buckling rupture discs however add substantially to the cost of such discs and are subject to failure due to corrosive activities of the fluids within the vent system, damage during handling or simply because a mechanic forgets to install the knife assembly which in normal discs results in disc bursting pressures which are many times the rated pressures of such discs. It has, therefore, been a goal of the rupture disc industry to produce a disc of the reverse buckling type which does not include knife assemblies, but which is highly reliable.

One reverse buckling disc, which was specifically designed to rupture without use of knife blades, incorporates the concept of placing grooves, scores or etchings, especially in a criss-cross or circular patterns on concave or convex faces of a reverse buckling rupture disc dome. A disc dome of this type can be seen in U.S. Pat. No. 3,484,817 to Wood. In the Wood device, the rupture disc dome buckles, reverse and fractures along the lines of weakness produced by the grooves so as to form petals which are held to the remainder of the rupture disc assembly.

There is also a problem in some conventional systems with portions of the rupture disc being entranced with the fluid being relieved. Pieces of rupture discs can cause damage to pumps and the like if they are allowed to freely break away from the remainder of the rupture disc assembly upon rupture. Therefore, it is important that the rupture disc dome or petals of the rupture disc domain remain intact after rupture and that they remain attached to the remainder of the disc.

There has been a continuing desire in the rupture disc industry to produce new types of reverse buckling rupture discs which have properties that make them especially suitable for specific purposes, more cost efficient, and/or make the disc more reliable. In particular, new reverse buckling discs are desired which will function at lower burst pressures, and reliably open at or below the rated burst pressure if damaged, without the need for knife blades for cutting the disc on reversal, and yet which will remain attached after rupture to minimize possible damage to the system protected by the disc.

Another notable problem arises in rupture discs designed to rupture at lower pressures. Such discs become more susceptible to damage or destruction caused by induced back pressure. Vacuum pressure in the convex direction of the disc dome causes movement and fractioning at the score of a reverse rupturing disc.

The present application addresses shortcomings associated with the prior art.

SUMMARY OF THE INVENTION

The present invention is directed to an improved reverse buckling rupture disc that eliminates or at least minimizes the above-mentioned drawbacks of such prior art devices. The reverse buckling rupture disc according to the present invention includes a disc-shaped flat flange region, a concave-convex reversible disc dome and a transition region that joins the flat flange region to the disc dome region. The concave-convex reversible disc dome region has a thickness and a configuration such that the disc dome reverses when a predetermined fluid pressure is exerted on the convex side and ruptures upon reversal. The disc may have one or more deformations formed at or near the apex of the disc dome. The one or more deformations are provided to weaken the disc dome and thereby cause the disc to buckle or reverse at a lower pressure than a disc of similar thickness, diameter, crown height and material type not having the one or more deformations. This makes the disc suitable for low pressure applications.

In a second aspect of the invention, a reverse rupture disc according to the present invention includes at least one irregular transition region adjacent to the transition region and coplanar with the annular flat flange region of the disc. The disc further includes a groove which is formed along a substantial portion of the transition region of the disc. The irregular transition region of the disc dome facilities rupturing of the disc along the groove. Preferably, the groove extends around an arc of approximately 330°, but may vary as desired. Similarly, the length or region without groove may vary as required in order to retain petal after burst. The ungrooved region of the disc forms a hinge about which the reversed and ruptured disc dome remains attached to the flat flange region of the disc after rupturing. This design prevents fragmentation of the disc dome. In a preferred embodiment of the present invention, the ungrooved portion of the disc is disposed a preselected distance from the irregular transition region.

In another aspect of the present invention, a shear enhancing means aids in the rupturing of the reversed disc. The shear enhancing means cooperates with the groove to facilitate rupturing of the disc along the groove upon the reverse buckling thereof. The shear enhancing means is preferably located to cooperate with the transition region, and more specifically with an irregular transition region. The shear enhancing means may consist of a protrusion or a notch which cooperates with the irregular transition. A shear enhancing means in the shape of a notch may provide better localized stress than a protrusion given the absence of support at only one location provided by a notch compared to the existence of support at only one location provided by a protrusion. The notch focuses localized stress on the groove at the corners of the notch, allowing the rupture disc dome to flex away from the pressure at the notch. More specifically, circular, triangular, rectangular, are among an infinite number of shapes of various sizes which can be employed to further control the pressure at which the disc fractures along the groove. The shear enhancing means may be a part of (e.g., affixed to) the reverse rupturing disc, although preferably the shear enhancing means is part of a support ring, or the rupture disc holder. The support ring further includes an arcuate projection which is located adjacent to the ungrooved region of the disc. The arcuate projection provides a support surface for the disc dome region of the disc after rupturing. Alternatively, the arcuate projection may be a part of a rupture disc ring or holder.

In another aspect of the present invention a back pressure support means protects the reverse rupture disc from damage or destruction potentially caused by induced vacuum or back pressure. The above enhancements alone, and in combinations with annealing the rupture disc after forming and scoring the disc material, have enabled the design and manufacture of very low pressure reverse buckling rupture discs. However, such low pressure discs require support in the reverse direction to protect against back pressures caused, for example, by vacuum or forward to reverse pressure cyclical conditions. A back pressure support means provides additional support in the convex direction of the transition region of the disc, including support for any irregular transition region. The back pressure support means may also extend over a portion of the concave-convex disc dome, as required for functional or manufacturing purposes. The back pressure support means may be a part of the reverse rupture disc, a support ring, or the disc holder.

DETAILED DESCRIPTION OF THE INVENTION

Figure 1:
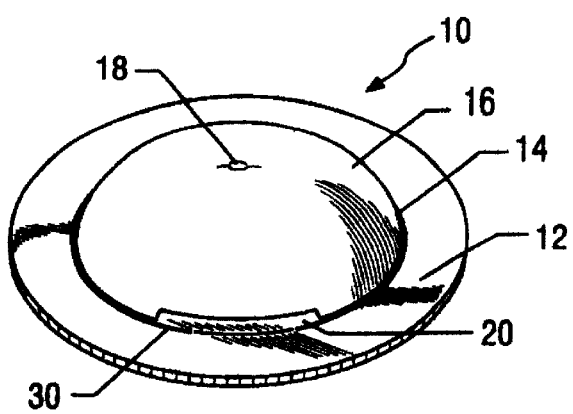
FIG. 1 is a perspective view of a reverse rupture disc according to the present invention.

Turning now to the drawing and referring initially to FIG. 1, reference numeral 10 generally designates a reverse rupture disc according to the present invention. The disc 10 is defined by an annular flat flange region 12, a transition region 14, and a disc dome 16, as is will understood by those skilled in the art. The reverse rupture disc 10 is formed of a metal material which may be made up of a number of compositions, including, for example, nickel, aluminum, gold, tantalum, and composite materials such as MONEL®, INCONEL®, or HASTELLOY C®. Alternatively, the reverse rupture disc may be formed from other suitable materials. In the presently preferred embodiment illustrate in FIG. 1, the disc dome region 16 of the rupture disc 10 has a deformation 18 formed at its geometric apex. Deformation as defined in this application refers to a weakening of the strength of the disc dome; one type of deformation may be a dimple. The deformation 18 is located in the rupture disc 10 and may have an irregular shape in the dome. The deformation 18 weakens the integrity of the disc dome 16 so that when pressure is applied to the disc 10, it will buckle at a pressure which is lower than the rated pressure for the disc absent the deformation 18. For example, assuming the rated burst pressure for the disc, absent any dimple, indentations, dents, or other damage, is 120 psi. The formation of the deformation 18 weakens the disc 10 so that it is likely to buckle at between approximately 40 to 80 percent of its rating pressure without the deformation (e.g., between approximately 48 to 96 psi). The depth of the deformation 18, material thickness, and crown height may also be used to adjust or set the rated burst pressure of the disc 10.

The theory behind placing the deformation 18 at the apex of the disc dome 16 is that it weakens the disc 10 at its most vulnerable location, so that the disc is less likely to buckle below its rated pressure, even if damaged. The reason that the apex of the disc dome 16 is believed to be the weakest point is because it is the thinnest region of the disc dome and it is at the geometric point on the disc dome which receives no vertical support from the disc dome column or arch. Tests have shown that incidental damage to the disc 10 in locations other than the apex does not cause the disc to buckle at a pressure lower than that required to make the disc 10 buckle with the deformation 18 formed at its apex. This design thus helps establish a minimum reliable pressure at which the reverse rupture disc 10 will buckle. With the deformation 18 being placed on the apex of the disc dome 16, the disc 10 begins to buckle at the rated pressure at the location of the deformation 18. Thus, the buckling initiates at the center of the disc dome 16 and propagates outward in a radial direction toward the transition region 14.

Figure 2:
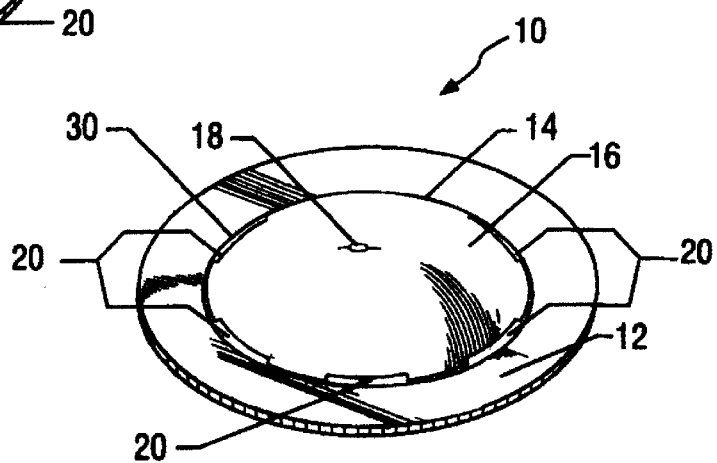
FIG. 2 is a perspective view of another embodiment of the reverse rupture disc according to the present invention.

In the preferred embodiment of the present invention, the annular flat flange region 12 connects to the dome 16 at an irregular transition region extending into the periphery of the dome as shown in FIG. 1. The flat flange region 12 is located in the disc and may include an arch or cord extending in the same plane extending radially inward past the groove (as discussed further below) causing the dome to have an irregular inner diameter. This irregular transition region is indicated by the reference numeral 20 and is coplanar with the annular flat flange region 12 of the reverse rupture disc 10. The disc dome 16 may be formed with one or more irregular transition regions 20 around the circumference of the base region of the disc dome 16. FIG. 1 illustrates one irregular transition region 20. FIG. 2 illustrates an alternate embodiment where multiple irregular transition regions 20 are disposed around the perimeter of the base region of the disc dome 16.

Figure 3A:
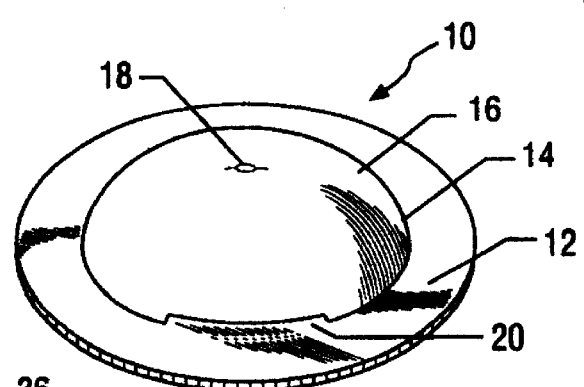
FIG. 3a is a perspective view of a reverse rupture disc assembly according to the present invention.
Figure 3A:
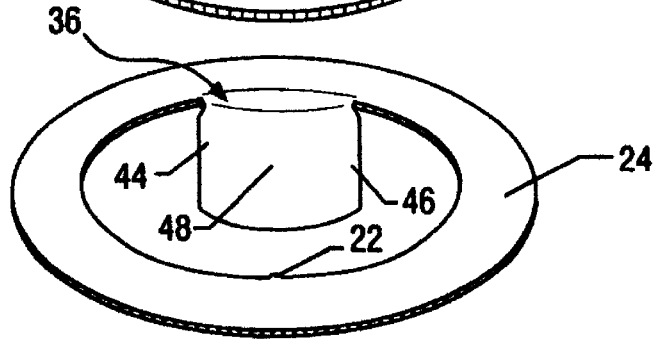

Returning to the embodiment illustrated in FIG. 1, the transition region 14, and more particularly the irregular transition region 20 of the disc dome 16, cooperates with a shear enhancing means such as a protrusion 22 formed in support ring 24 (shown in FIG. 3a) or a notch 23 formed in outlet ring 25 (shown in FIG. 3b) to facilitate rupturing the disc 10. Alternatively, the shear enhancing means could be part of the disc 10, any support ring, or a rupture disc holder 27. A shear enhancing means in the shape of a notch will provide better localized stress than a protrusion given the absence of support at one point rather than the existence of support at one point. A circular shape has been used successfully, but many shapes for the notch can be employed to channel sufficient stress to the irregular transition region 20 to meet design criteria. One skilled in the art will appreciate that single or multiple shear enhancing means with any number of shapes and locations may be employed with the multiple irregular transition regions 20 of FIG. 2.

Figure 3B:
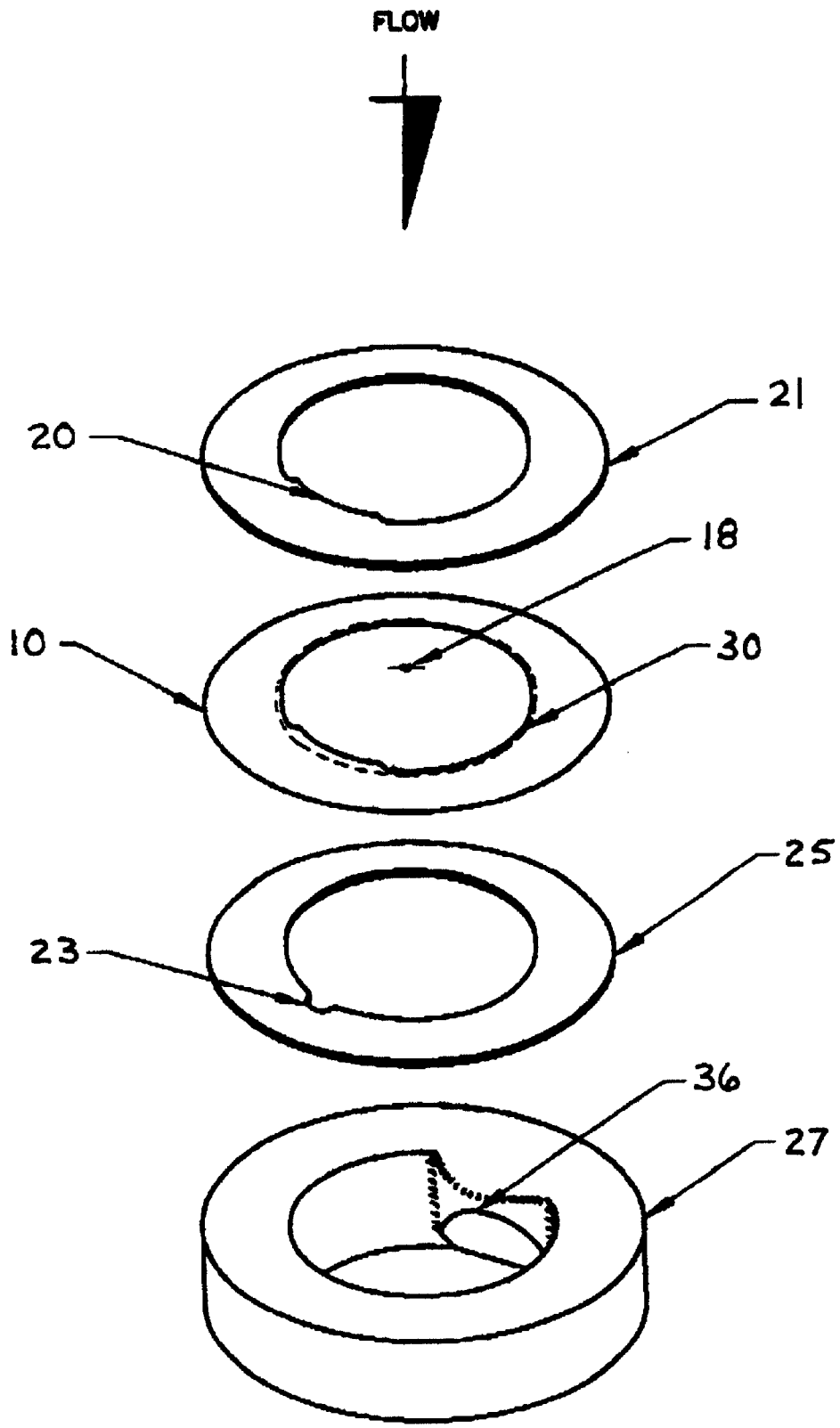
FIG. 3b is an exploded view of one embodiment of a reverse rupture disc provided with shear enhancing means and back pressure support means.
Figure 3C:
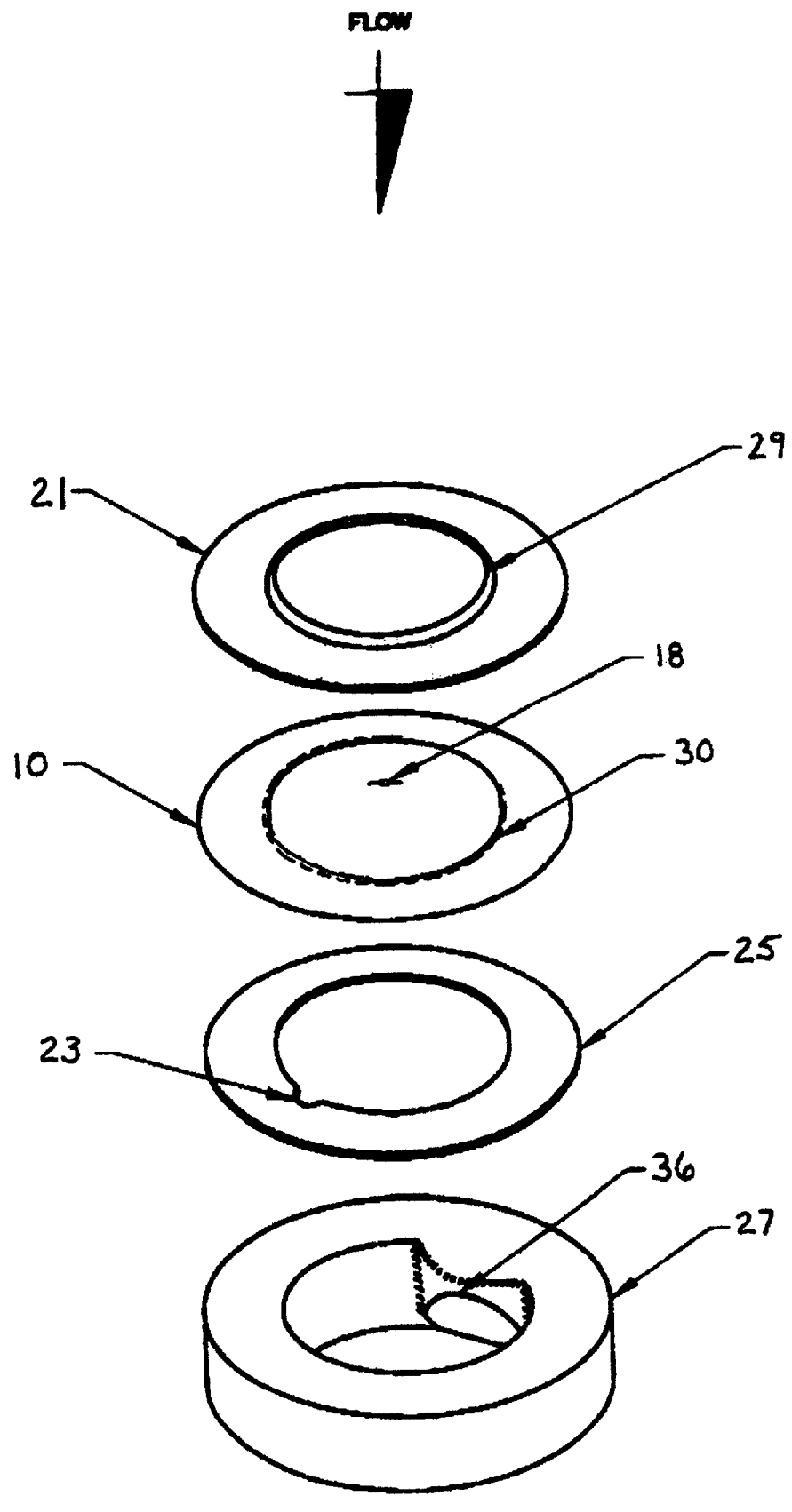
FIG. 3c is an exploded view of one embodiment of a reverse rupture disc provided with shear enhancing means and back pressure support means extending over a portion of the concave-convex disc dome region.
Figure 3D:
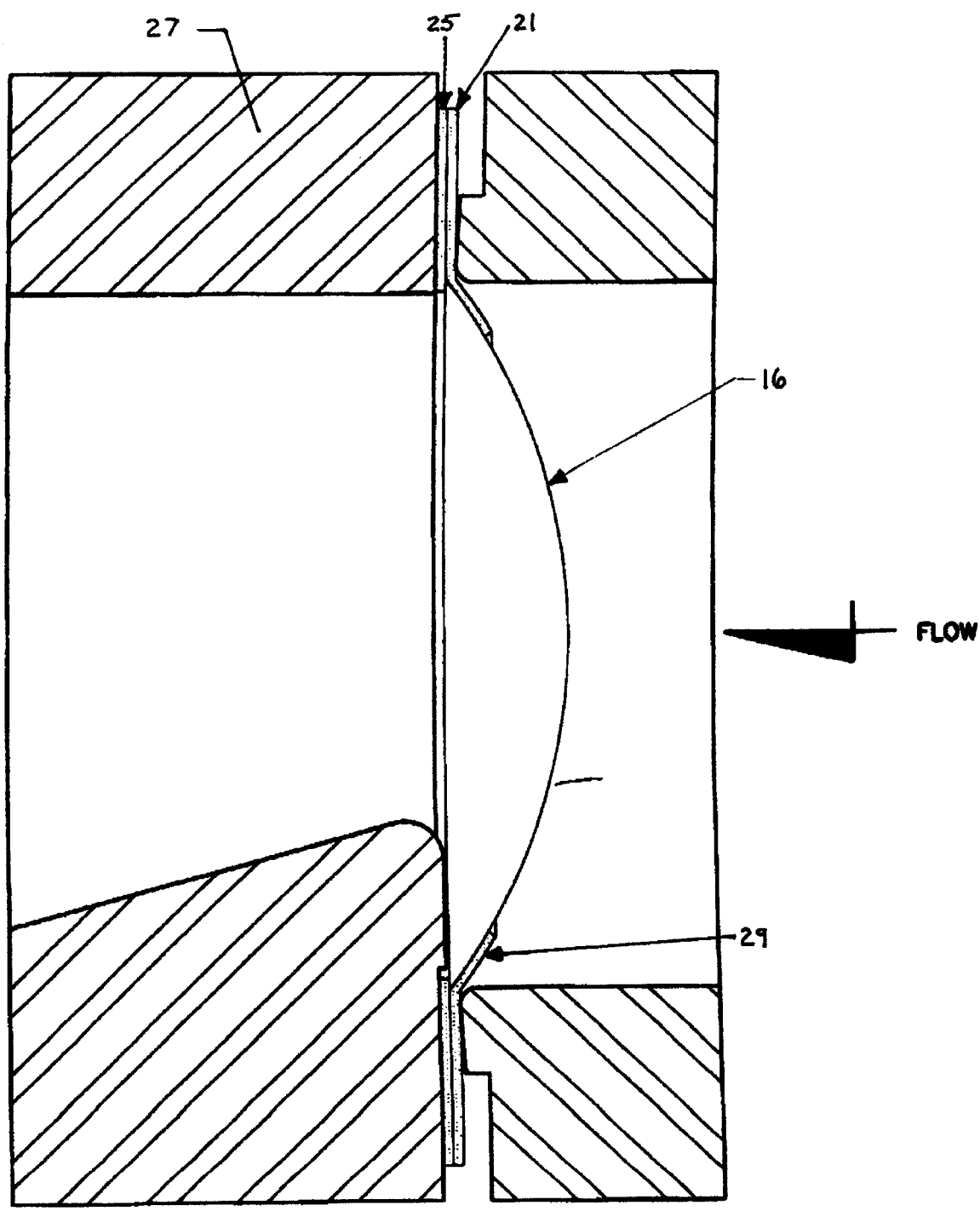
FIG. 3d is a cross-sectional view of back pressure support means extending over a portion of the concave-convex disc dome region.

Discs designed to rupture at low pressures give rise to another aspect of the present invention, a back pressure support means which protects the reverse rupture disc 10 from damage or destruction potentially caused by induced back pressure. As illustrated in FIG. 3b, the back pressure support means may take the same dimensions as the transition region 14, including the irregular transition region 20 as required for support. Alternatively, the support means may extend a portion of the disc dome 16 in the form of a flange 29, as shown in FIGS. 3c and 3d. The back pressure support means may be a part of the disc 10, any support ring such as an inlet ring 21, or disc holder 27. One skilled in the art will appreciate the back pressure support means with any number of shapes and locations may be employed to protect the disc 10. The embodiment illustrated in FIG. 3b shows a disc dome having a deformation 18; however, it is understood that the back pressure support means functions independently of the deformation and may be used with a standard disc dome.

With respect to back pressure support, the key area of the disc 10 in need of support is the scored, or grooved region 30, to be discussed in greater detail below. The combination of employing disc grooving, deformation(s) at or near the apex of the dome, irregular transition region(s), shear enhancing means, and annealing the disc as the last step, has enabled production of very low burst pressure discs. Annealing the disc will relieve stress incurred in the material during the forming and scoring processes, allowing the groove line to fracture more readily than without the annealing step. For example, such an annealed two inch disc, employing a notch as the shear enhancing means, will reverse and rupture at two psi. However, vacuum pressures of 15 psi are not uncommon forces in the convex direction of reverse rupturing discs. Therefore, additional support in the convex direction is required for such low pressure discs.

Vacuum pressure on the rupture disc dome causes it to move very slightly in the convex direction, thus flexing and fracturing the groove 30. This is due to the very thin rupture disc material thickness remaining after being scored. The groove cannot resist much vacuum pressure and resulting movement in the convex direction before fracture. To solve this problem, an inlet ring 21 having dimensions similar to the flat flange region 12, including any irregular transition region 20, would sufficiently support the scored region to prevent movement of the dome 16 in the convex direction, in turn preventing undesirable score fatigue and premature failure at the groove 30. Since the rupture disc dome 16 has rigidity from being formed, it is not required for the inlet ring 21 to support the rupture disc dome in more than the area of the irregular transition region 20. However, for manufacturing or design requirements, or in embodiments without an irregular transition region, the inlet ring 21 may extend over a portion of the disc dome 16 in the form of a flange 29, as shown in FIG. 3c. The inlet ring 21 will allow the rupture disc 10 to continue to perform satisfactorily after being exposed to full vacuum and cycling conditions of positive to vacuum pressure.

Figure 4:
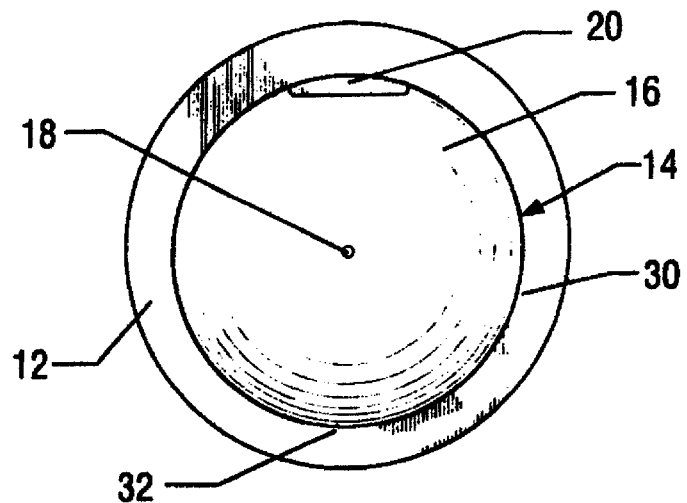
FIG. 4 is a top view of the reverse rupture disc shown in FIG. 1.

The rupture disc 10 further includes a partial groove 30, which is formed in the transition region 14. The partial circular groove 30 extends around a substantial portion of the perimeter of the disc dome 16 in an arc which is approximately 330°, as shown in FIG. 4. The depth of the partial circular groove 30 is generally greater than 66 percent of the thickness of the disc 10 in the transition region 14. The approximately 30° arcuate section where the partial circular groove 30 does not span is indicated generally by reference numeral 32. One skilled in the art will appreciate that the size of the perimeter of the disc dome and the arcuate section may vary depending on design considerations. This region of the transition region 32 functions as a hinge or tab for the rupture disc 10 at the time of bursting. Upon bursting, the disc dome 16 tears away from the flange region 12 along the groove 30, and remains intact or untorn in the tab region 32. This design enables the disc 10 to open and retain the disc dome 16, much like the way opening of a push-tab soda cans allows a region of the table to remain connected.

Figure 5:
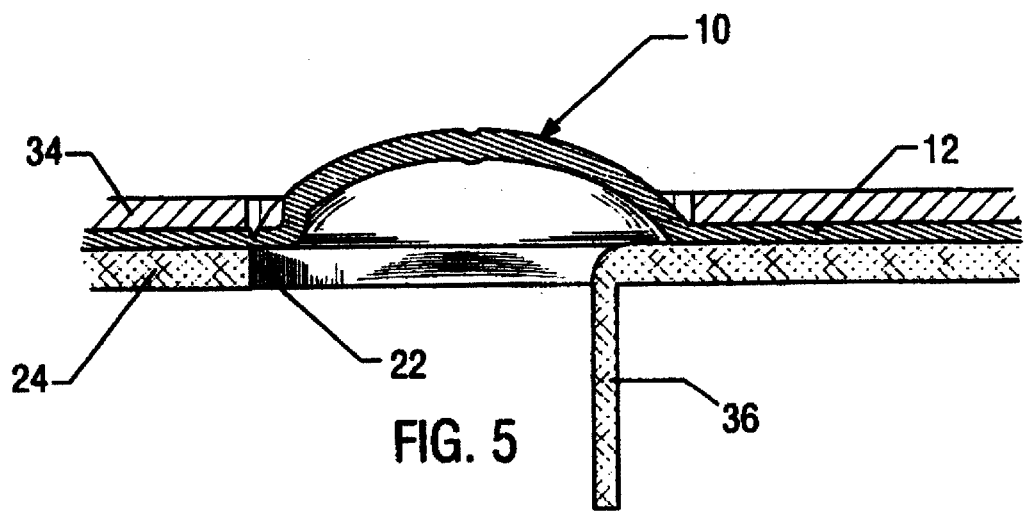
FIG. 5 is a cross-sectional view of the reverse rupture disc according to the present invention in an installed position.

FIG. 5 shows the disc 10 installed between two support rings, an upstream support ring 34 and a downstream support ring 24. The upstream and downstream support rings, 34,24 hold the disc 10 in place between oppositely facing disc holders and vent pipe sections 4 and 5, as shown in FIG. 1 of U.S. Pat. No. 4,669,626 issued to applicant, the disclosure of which is incorporated herein by reference. The upstream support ring 34 is disposed above the flat flange region 12 of the disc 10. The inner edge of the upstream support ring 34 generally lies above the center of the partial circular groove 30. The downstream support ring 24 is disposed below the flat flange region 12 of the disc 10. The inner edge of the downstream support ring 24 generally lies below the center of the partial circular groove 30. The inner edge of the downstream support ring 24 acts as a shearing edge for the groove 30.

Figure 12:
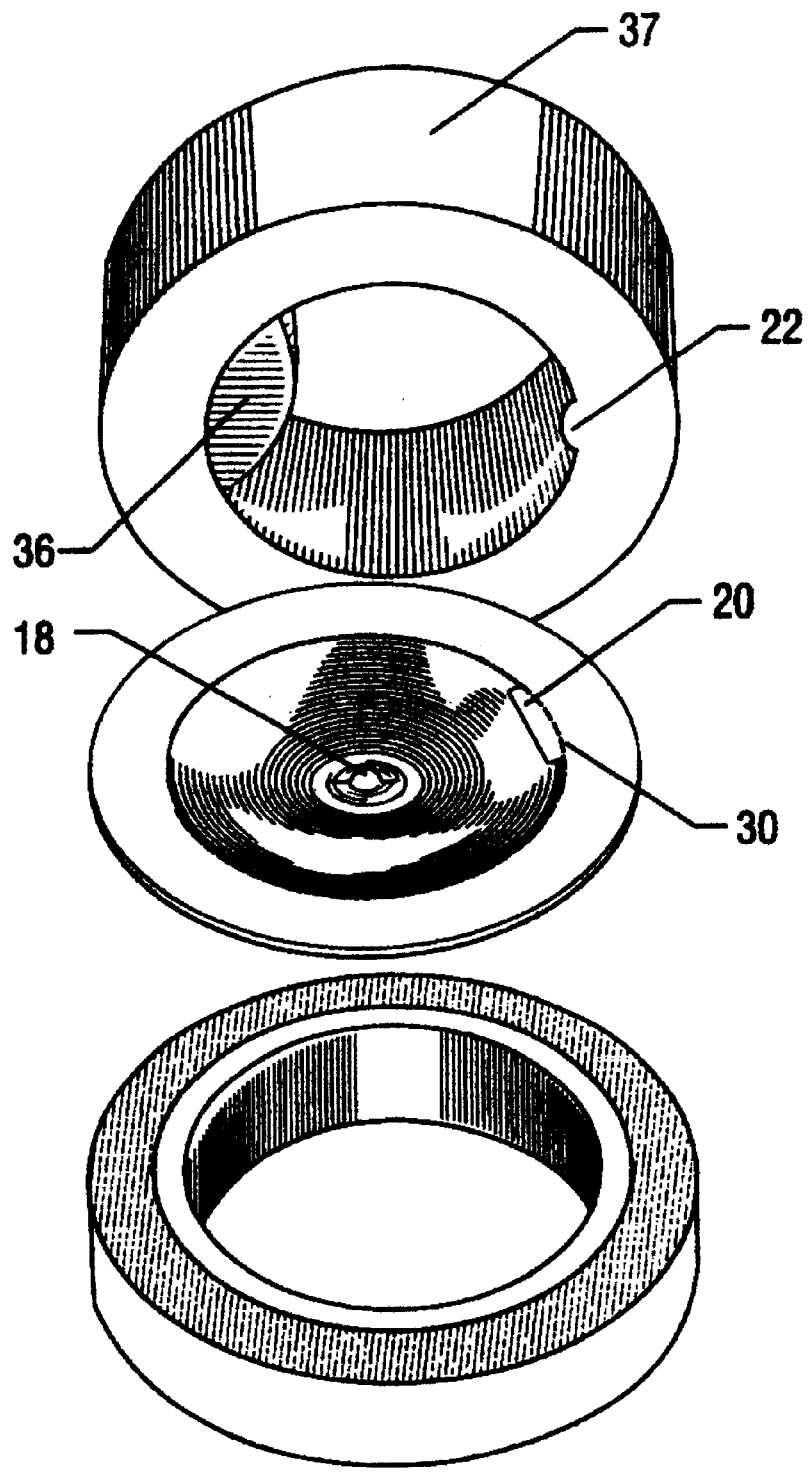
FIG. 12 is a perspective view of a rupture disc holder in accordance with the invention.

The downstream support ring 24 has a protrusion 22 and an arcuate projection 36, best shown in FIG. 3. It extends radially inward from the inner diameter and may vary in length or width. Alternatively, the downstream support ring 24 (e.g., outlet ring 25) has a notch 23 as shown in FIG. 3b. The protrusion 22, or notch 23, is located in the downstream support ring 24 or holder and may take the form of a spike, point of triangular shape, or other desirable shape. In an alternative embodiment, the protrusion 22, or notch 23, and the arcuate projection 36 are housed in a rupture disc holder 37 shown in FIG. 12. In embodiments employing an irregular transition region as discussed above, the protrusion 22, or notch 23, cooperates with the irregular transition region 20 of the disc dome 16 to rupture the disc 10. This occurs as follows. Once the overpressure reaches the rated pressure of the disc 10, the disc begins buckle and reverse. During reversal, a downward pressure is exerted on the disc 10 pushing the disc downstream. Meanwhile the protrusion 22 acts on the irregular transition region 20, thus applying a localized, upwardly-directed counter force. Alternatively, the notch 23 would increase localized stress on the irregular transition region 20 by providing no counter force against the overpressure at one or more locations. The overpressure in combination with the oppositely directed forces due to the protrusion 22, or the lack of counterforce due to the notch 23, exert a stress on the partially circular groove 30, which causes the disc 10 to initiate shearing along the groove 30. Because the groove 30 is not formed in the tab region 32, the disc 10 does not shear in that region. The tab region 32 thus acts as a hinge securing the ruptured disc 10 to the annular flat flange region 12.

Figure 6:
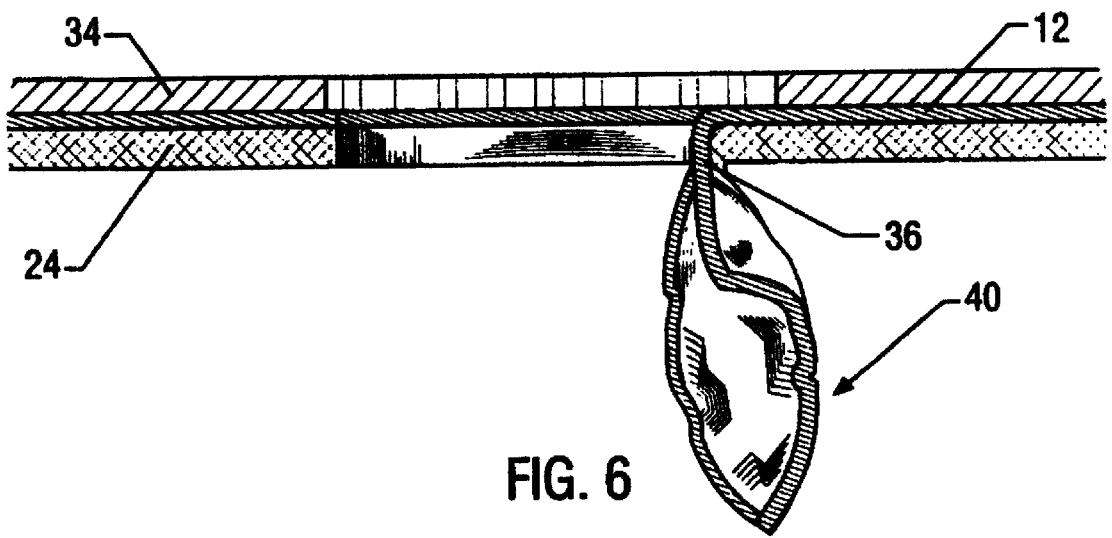
FIG. 6 illustrates the reverse rupture disc according to the present invention after rupturing.

The arcuate projection 36 of the supporting ring 24 is downstream of, and preferably aligned with, the tab region 32 such that, when the rupture disc 10 bursts the disc dome 16 will pivot about the tab region 32 and engage the arcuate projection 36, as shown in FIG. 6. FIG. 6 illustrates the ruptured and somewhat crumpled disc dome, as indicated by the reference numeral 40, wrapped about the projection 36, especially in the area of the groove 30 that tore from the flange region 12, but which was adjacent to the hinge region 32. The projection 36 is arcuate along its radially inward edge. The arcuate projection 36 has radially outward ends thereof 44 and 46 which include the arch 48 therebetween (shown in FIG. 3) which is generally similar to but slightly larger than the arch encompassed by the tab region 32.

The above-described design ensures that the disc 10 will not only reserve at the rated pressure (which is determined after the deformation 18 is formed therein), but also open at the pressure. The deformation 18 makes it less likely that any incidental damage to the disc 10 does not cause the disc to reverse at a pressure lower than the rated pressure. The groove 30 in combination with the irregular transition region 20 of the disc dome 16, which cooperates with the protrusion 22, or notch 23, essentially ensures that the disc 10 opens at its rated pressure.

As discussed above, prior art discs, which have been incidentally damaged, may not both reverse and open at their rated pressure. They may reserve at a lower pressure but not open until a much higher pressure. The design of disc 10 described herein is intended to overcome these drawbacks. In addition, disc 10 can be designed to operate effectively as a reverse buckling rupture disc in a low pressure system. In this type of system, disc 10 would both reverse and rupture which is different from numerous prior art discs. Finally, the present invention does not require a knife assembly and which minimizes the likelihood of damage to the system. The disc 10 according to the present invention solves several of the problems of conventional discs.

Figure 7:
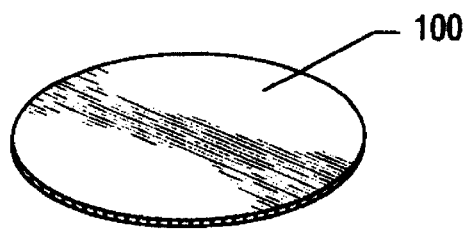
FIG. 7 is a perspective view of a planar material to be formed into a reverse buckling rupture disc according to the present invention.
Figure 8:
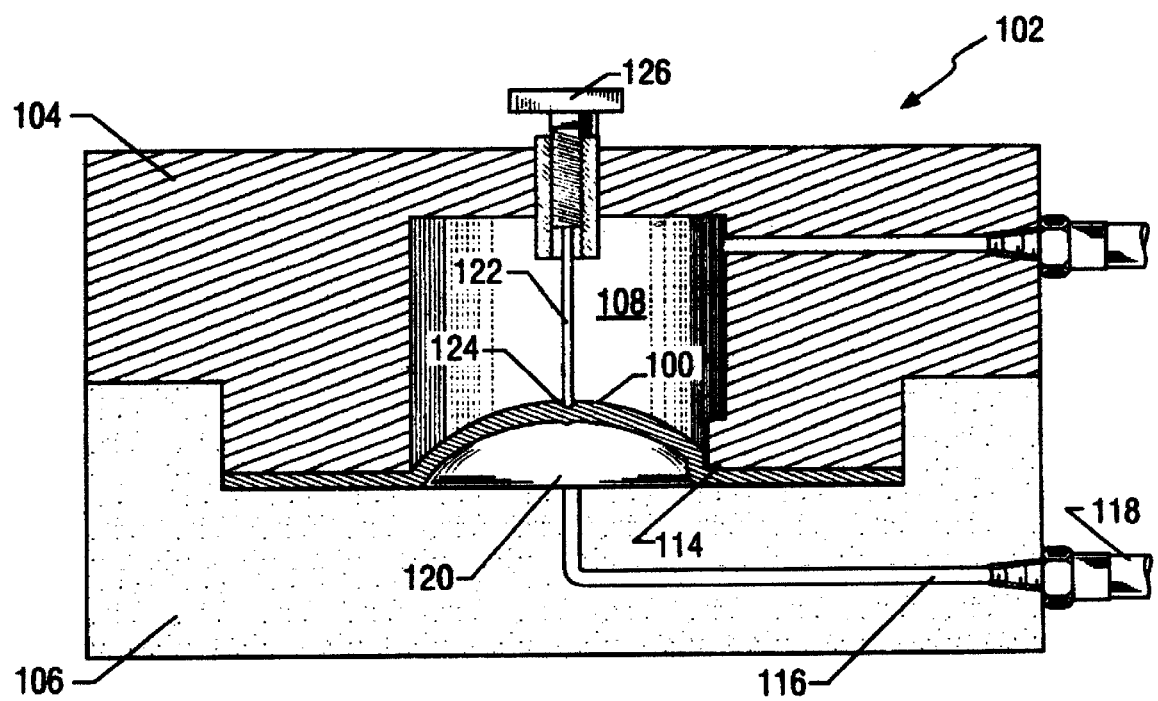
FIG. 8 is a cross-sectional view of an apparatus used in forming the disc dome, deformation and irregular transition region of the reverse rupture disc according to the present invention.

FIGS. 7–11 illustrate different steps in the method of manufacture of a reverse rupture disc 10 according to the present invention and illustrate various structures utilized in the manufacture of the present invention. FIG. 7 illustrates a planar sheet of material (e.g., metal) 100 from which a reverse rupture disc, such as the previously described disc 10, is manufactured. FIG. 8 illustrates an apparatus 102 for forming a rupture disc 10 from such a material 100. The apparatus 102 includes an upper member 104 and a lower member 106 which generally mate together so as to define a chamber 108 therebetween. A protrusion 114 which is part of the upper member 104 is provided to form the irregular transition region 20 in the base of the disc dome 16, as explained above and shown in FIG. 1.

A fluid supply passage 116 communicates a suitable source of pressurized fluid from a hose 118 to a lower region 120 of the chamber 108, in which chamber region 120 is shown below the material 100. As fluid is supplied to the chamber 108 at sufficient pressure, the material 100 bulges, forming the disc dome 16. A rod 122 having a rounded end 124 protrudes into the chamber 108 from the upper member 104 of the apparatus 102. The rod 122 forms the deformation 18 in the disc dome 16 as the material 100 bulges under pressure. The rod 122 can be adjusted axially using a micrometer 126 which in turn adjusts the size and depth of the deformation 18. Also, by adjusting the pressure of the fluid to the passage 116, the height of the disc dome 16, also known as the crown height, can be adjusted.

Figure 9:
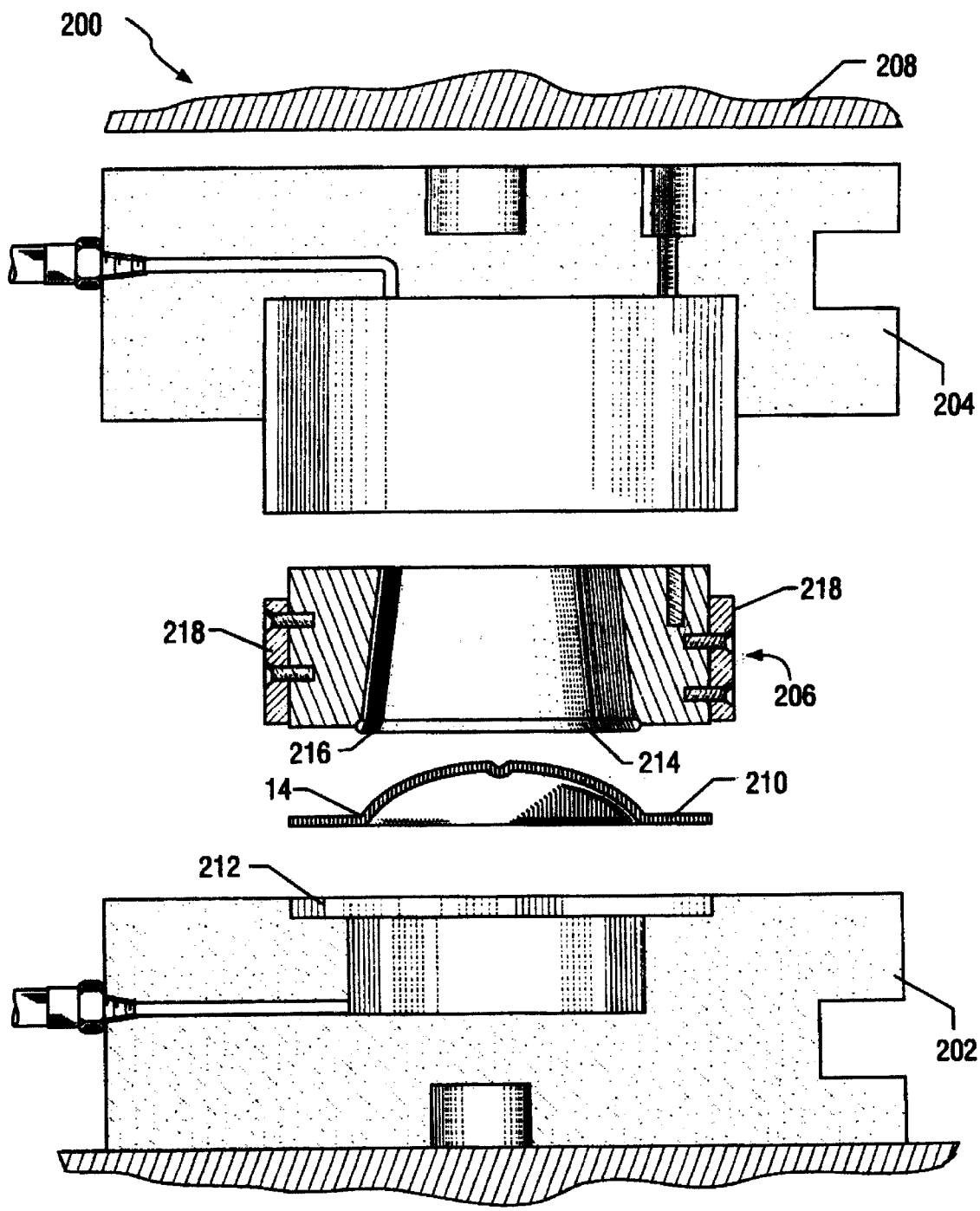
FIG. 9 is an exploded cross-sectional view of a grooving apparatus having a knife blade for placing a circumferential groove in the transition region of the disc.
Figure 10:
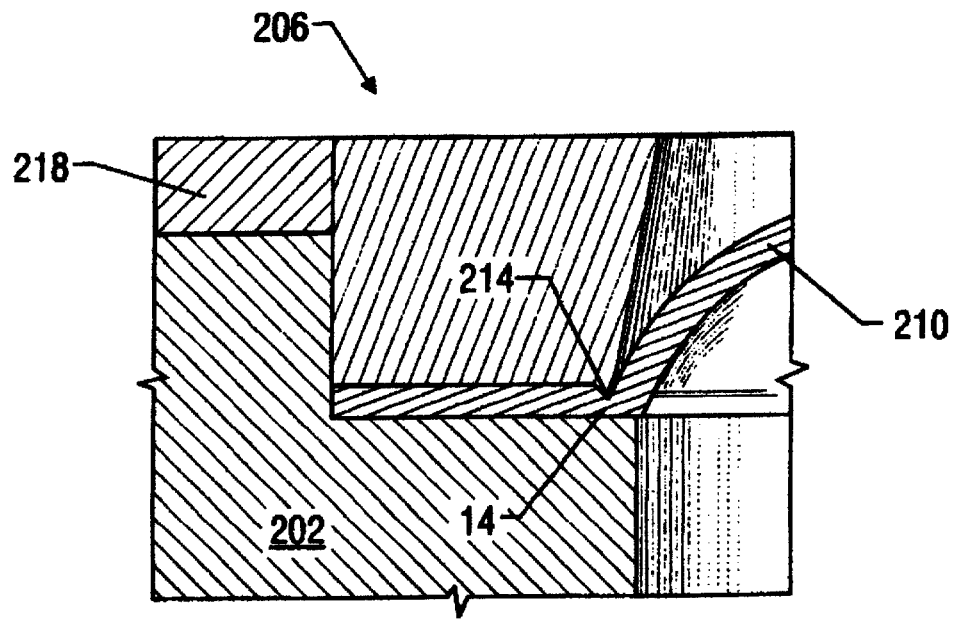
FIG. 10 is an enlarged fragmentary cross-sectional view of the apparatus and disc of FIG. 9 showing the disc during the actual process step of forming a groove in the transition region.
Figure 11:
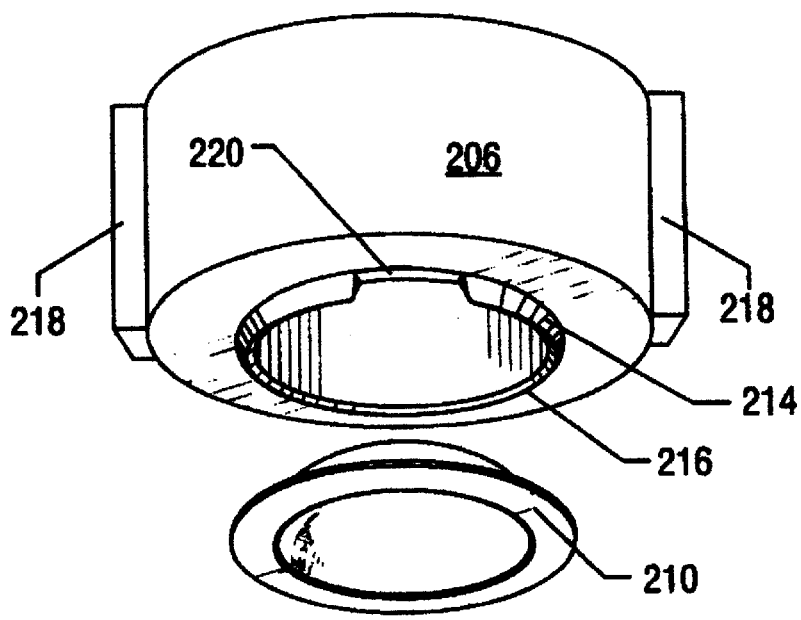
FIG. 11 is an exploded perspective view of the rupture disc and die from the grooving apparatus shown in FIG. 9 following the formation of a groove in the disc in the transition region.

A grooving apparatus 200 for performing the grooving process is shown in FIGS. 9, 10 and 11. The apparatus 200, as shown in FIG. 9, includes a lower holder member 202, an upper holder member 204, which mates with the lower holder member 202, a die or knife holding member 206, and force exerting means such as the partially shown hydraulic press mechanism 208. A prebulged disc 210 is placed in a seat 212 in the lower holder member 202. The knife holding member 206 includes a circular knife 214 having an edge 216 having a radius which is slightly larger than the rupture disc dome radius, but the same size as the radius of the groove 30 of FIG. 1.

The knife edge 216 is placed in engagement with the disc transition region 14, as shown in FIG. 10, and force is applied by the press 208. Stops 218 on the knife holding member 206, shown in FIG. 9, engage the holder 202 to facilitate proper grooving of the disc 10 so that the groove 30, as seen in FIG. 10, has a proper depth associated therewith. The knife 214, shown in FIG. 11, is only partially circumferential and includes a sector 220 in which the knife 214 is omitted to leave a region of the disc transition region 14 ungrooved. The sector 220 occupies an arc of a preselected size (e.g., approximately 30°). The stops 218 are removed from the knife-holding member 206 to facilitate alternate use of the other stops specifically designed for other particular depths and/or other disc thicknesses. Alternatively, the knife 214 can be replaced by other types of knife members so as to the limit the depth of a groove in the region 220. A final step after scoring may be to anneal the disc to allow the score line to fracture more readily.

While the present invention is susceptible to various modification in alternate forms, several of which have been discussed above, it should be understood that the invention is not intended to be limited to the particular forms disclosed. Rather, the invention is intended to cover all modifications, equivalents, and alternatives falling within the spirit and scope of the invention as defined by the appended claims.

What is claimed is:

1. A reverse buckling rupture disc, comprising:
   a) an annular flat flange region;
   b) a concave-convex disc dome region;
   c) a transition region that joins the annular flat flange region to the concave-convex disc dome;
   d) a groove extending around at least a portion of the disc dome region; and
   e) a back pressure support disc situated adjacent the convex side of the concave conveys disc dome region, wherein at least a portion of the back pressure support device extends into the periphery of the concave-convex disc dome region to limit movement of the concave-convex disc dome in the convex direction.

2. The reverse buckling rupture disc of claim 1, wherein the transition region includes an irregular transition region extending into the periphery of the disc dome region, such that the transition region defines an irregular diameter.

3. The reverse buckling rupture disc of claim 2, wherein the portion of the back pressure support device that extends into the periphery of the concave-convex disc dome corresponds to the irregular transition region.

4. The reverse buckling rupture disc of claim 1, wherein the device defines a shape corresponding to the shape of the transition region.

5. The reverse buckling rupture disc of claim 1, wherein the device encircles a portion of the concave-convex disc dome region.

6. The reverse buckling rupture disc of claim 1, wherein the device defines a flange with an interior diameter smaller than the diameter defined by the groove.

7. The reverse buckling rupture disc of claim 1, wherein the device comprises an inlet ring.

8. The reverse buckling rupture disc of claim 1, wherein the device comprises a disc holder.

9. The reverse buckling rupture disc of claim 1, wherein the concave-convex disc dome region defines a concave deformation at or near the apex of the dome.

10. A reverse buckling rupture disc, comprising:
    a) an annular flat flange region;
    b) a concave-convex disc dome region;
    c) a transition region that joins the annular flat flange region to the concave-convex disc dome;
    d) a groove extending around at least a portion of the disc dome; and
    e) means for providing back pressure support situated on the convex side of the concave-convex disc dome region for limiting movement of the concave-convex disc dome in the convex direction.

* * * * *

UNITED STATES PATENT AND TRADEMARK OFFICE
CERTIFICATE OF CORRECTION

PATENT NO. : 6,431,383 B1
DATED : August 13, 2002
INVENTOR(S) : Robert M. Mozley and James M. Shivers It is certified that error appears in the above-identified patent and that said Letters Patent is hereby corrected as shown below:

Column 10,
Line 11, delete "conveys" and insert -- -convex --

Signed and Sealed this

Fourth Day of March, 2003

JAMES E. ROGAN
*Director of the United States Patent and Trademark Office*